United States Patent [19]

Hein

[11] Patent Number: 4,854,766
[45] Date of Patent: Aug. 8, 1989

[54] SLIP BEARING FOR A SWAY BAR CLAMP

[75] Inventor: Richard D. Hein, Wabash, Ind.

[73] Assignee: GenCorp Inc., Fairlawn, Ohio

[21] Appl. No.: 193,014

[22] Filed: May 12, 1988

[51] Int. Cl.⁴ ............................................. F16C 11/00
[52] U.S. Cl. .................................. 403/224; 403/225; 280/689
[58] Field of Search .................. 280/716, 689, 723; 403/225, 228, 224

[56] References Cited

U.S. PATENT DOCUMENTS 3,315,952  4/1967  Vittone .......................... 280/689 X
4,327,995  5/1982  Stewart .......................... 280/721 X Primary Examiner—Andrew V. Kundrat

[57] ABSTRACT

A clamp is described for resiliently mounting a sway bar on an automobile frame. The clamp comprises a U-shaped bolt and plate, a split cylindrical rubber innerliner adjacent the plate, a split cylindrical elastomeric sleeve adjacent the innerliner for contacting the sway bar, and a split cylindrical layer of material between the sleeve and innerliner for reducing the coefficient of friction between the sleeve and innerliner to a level where any slippage between the sway bar and clamp will shift away from the metal sway bar to the interface between the innerliner and sleeve.

14 Claims, 1 Drawing Sheet

SLIP BEARING FOR A SWAY BAR CLAMP

BACKGROUND OF INVENTION

The invention relates to clamps, especially clamps with slip bearings that are used to mount metal sway bars to automobile frames. Such clamps are normally comprised of a U-shaped bolt and plate which hold a split, annular rubber innerliner in compressive engagement with the sway bar, when the clamp and sway bar are properly secured to the automobile frame. The rubber innerliner may be a separate part, or integrally molded to the inside of the U-shaped bolt and plate assembly.

In either case, the rubber to metal contact of the innerliner and sway bar produces an annoying squeaking noise, when the automobile is in operation. To combat this, the inner periphery of the rubber innerliner is coated with Teflon which has a lower coefficient of friction than the rubber of the innerliner. This has proven to be a rather expensive solution to the problem. Moreover, the sway bars are oftentimes forged with rough outer surfaces which can quickly destroy the Teflon coating and cause the problem to reappear. The invention is designed to shift the interface of slippage between the clamp and sway bar away from the unfriendly metal surface of the sway bar to a friendly interface of the clamp.

Briefly stated, the invention is in a sway bar clamp which comprises an assembly of a U-shaped metal bolt and plate with a rubber innerliner and an elastomeric sleeve which is separately mounted around the sway bar. Either the outer periphery of the sleeve, or the inner periphery of the innerliner, or both, may be coated with a low friction material so that any slippage, caused by movement between the clamp and sway bar, occurs between the elastomeric materials in radially spaced relation from the metal sway bar.

DESCRIPTION OF DRAWING

The following description of the invention will be better understood by having reference to the accompanying drawing, wherein.

DETAILED DESCRIPTION OF DRAWING

Figure 1:
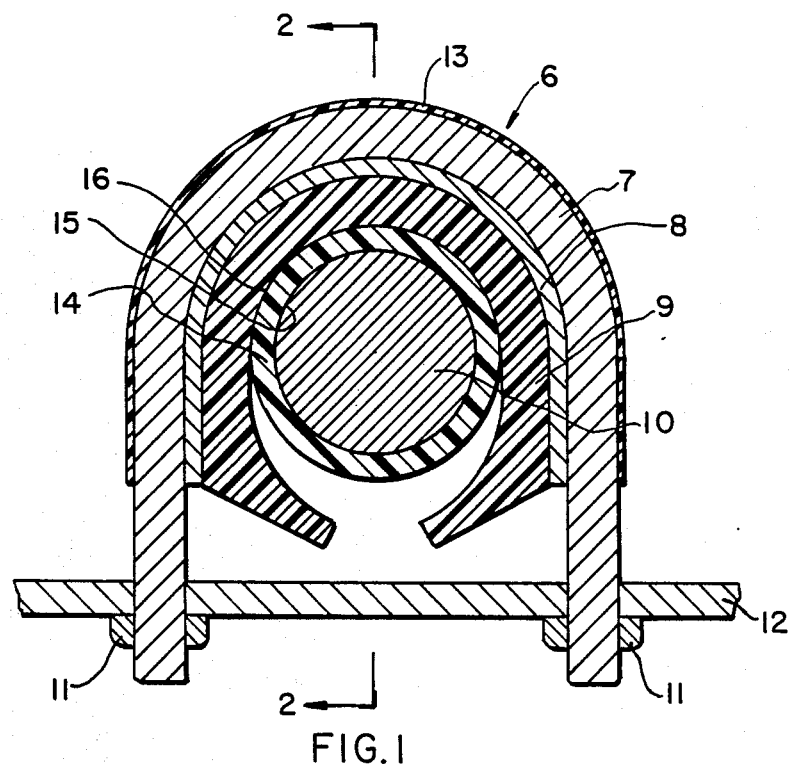
FIG. 1 is a cross-section of a sway bar clamp which is made in accordance with the invention, and shows the clamp in relation to an automobile frame.
Figure 2:
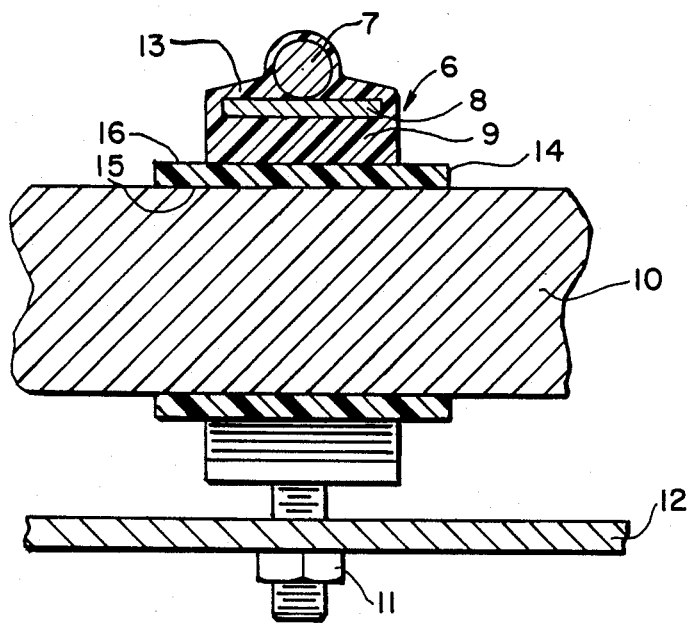
FIG. 2 is a section of the clamp viewed from the line 2—2 of FIG. 1.

With particular reference to the drawing, there is shown a sway bar clamp which comprises a U-shaped bolt 78 in juxtaposed relation to a matingly configured cylindrical plate 8, which is sandwiched between the bolt 7 and a generally cylindrical innerliner 9 which is composed of any suitable elastomeric material, e.g. rubber, and which is split longitudinally and normally designed to surround and compressively engage a sway bar 10, when the clamp 6 and attached sway bar 10 are fastened by nuts 11 to an adjacent automobile frame 12. The innerliner 9 may be molded to the bolt 7 and plate 8, both of which are covered by an outer layer 13 of the elastomeric material during the molding process to form an integral clamp assembly for easy handling.

A separate, hollow cylindrical sleeve 14 is interposed between the rubber innerliner 9 and metal sway bar 10. The sleeve 14 is composed of any suitable elastomeric material, e.g. plastic, and may also be split longitudinally for easy mounting on the sway bar 10, prior to the placement of the innerliner 9, plate 8 and bolt 7 around the elastomeric sleeve 14 and sway bar 10.

It is important to shift the interface of slippage between the clamp 6 and sway bar 10 away from the unfriendly metallic surface of the sway bar 10. This is accomplished by increasing the frictional engagement between the sway bar 10 and elastomeric sleeve 14 and decreasing the frictional engagement between the rubber innerliner 9 and elastomeric sleeve 14, so that the difference between the two will be sufficient to shift the interface of slippage away from the metal-to-elastomer interface of the sway bar and sleeve to the elastomer-to-elastomer interface of the sleeve and innerliner. Accordingly, the inner cylindrical surface 15 of the elastomeric sleeve 14 which contacts the sway bar 10, is molded or extruded with knurls or serrations to provide a rough inner surface with a high coefficient of friction. The outer cylindrical surface 16 of the elastomeric sleeve 14 which contacts the rubber innerliner 9 is treated in an opposite manner, i.e. it is coated with any suitable material which has a low coefficient of friction, such as Teflon, silicone, etc. Thus, the differences in the coefficients of friction of the two interfaces will be substantial and sufficient to cause slippage between the clamp 6 and sway bar 10 to occur at the interface of the two elastomers; namely, the rubber innerliner 9 and elastomeric sleeve 14.

The elastomeric compositions of the sleeve 14 and low friction coating on the outer surface 16 of the sleeve 14 are not detailed, since they depend on the design requirements which vary from application to application. For example, these compositions would probably differ depending on whether the clamps are used on small passenger vehicles, or large heavy trucks. Whichever the case, it is necessary to shift the interface of slippage between the clamp 6 and sway bar 10 away from the unfriendly metal surface of the sway bar to a friendlier interface for longer wear and better performance.

Thus, there has been described a sway bar clamp with a unique slip bearing which is simple and inexpensive to manufacture. This slip bearing eliminates the undesirable squeaking noise and is less susceptible to destruction by the sway bar to which the elastomeric sleeve clings and acts as a protective shield for the rubber innerliner of the clamp.

What is claimed is:

1. A clamp for resiliently mounting a cylindrical metal part, such as a sway bar, comprising:
   (a) a generally cylindrically-shaped elastomeric innerliner which is designed to at least partially surround the outer cylindrical surface of a cylindrical metal part;
   (b) means coacting between the innerliner and part for shifting the interface of slippage between the clamp and part away from the outer metallic surface of the part to the inner cylindrical surface of the innerliner closest the part, the means including:
   (c) a hollow cylindrical elastomeric sleeve which is separate from the innerliner and which surrounds and is interspersed between the part and innerliner; and
   (d) means coacting with the sleeve for decreasing frictional engagement between the sleeve and innerliner to a level which is substantially lower than the frictional engagement level between the sleeve and metal part.

2. A clamp for resiliently mounting a cylindrical metal part, such as a sway bar, comprising:
   (a) a generally cylindrically-shaped elastomeric innerliner which is split longitudinally and designed to at least partially surround the outer cylindrical surface of a cylindrical metal part;
   (b) means coacting between the innerliner and part for shifting the interface of slippage between the clamp and part away from the outer metallic surface of the part to the inner cylindrical surface of the innerliner closest the part, the means including:
   (c) a hollow cylindrical elastomeric sleeve which is separate from the innerliner and which surrounds the metal part between the part and innerliner; and
   (d) means coacting with the sleeve for decreasing frictional engagement between the sleeve and innerliner to a level which is substantially lower than the frictional engagement between the sleeve and metal part, so that the interface will shift away from the outer metal surface of the part.

3. The clamp of claim 2, wherein the friction decreasing means (d) includes an elastomeric coating on the sleeve adjacent the innerliner, the elastomeric coating having a low coefficient of friction.

4. The clamp of claim 3, which includes means for increasing frictional engagement between the metal part and sleeve to insure that slippage between the clamp and part occurs between the sleeve and innerliner rather than between the sleeve and metal part.

5. The clamp of claim 4, wherein the innerliner is rubber and the sleeve is plastic.

6. The clamp of claim 5, which includes means coacting with the innerliner for helping to stabilize it in a cylindrical shape around the sleeve.

7. A clamp for resiliently mounting a cylindrical metal part, such as a sway bar, comprising:
   (a) a metal bolt with a pair of opposing ends;
   (b) a parti-cylindrical metal plate adjacent the inner periphery of the bolt, the plate having a pair of opposing marginal edges;
   (c) a generally cylindrical rubber innerliner adjacent the inner periphery of the plate in spaced relation from the bolt, the innerliner being split longitudinally between the marginal edges of the plate;
   (d) a cylindrical elastomeric sleeve, separate from the metal part and innerliner, designed for placement around the metal part; and
   (e) means coacting between the sleeve and innerliner for decreasing the friction between them, so that any slippage, caused by relative movement of the clamp and part, will occur at the interface between the sleeve and innerliner rather than at the interface between the sleeve and metal part.

8. The clamp of claim 7, wherein the means includes a layer of elastomeric material which has a coefficient of friction which is sufficiently low to cause such slippage at said interface.

9. The clamp of claim 8, which includes means coacting between the sleeve and metal part for increasing the friction between them.

10. The clamp of claim 9, wherein the friction increasing means includes a deliberately roughened inner cylindrical surface of the sleeve for contacting the metal part.

11. The clamp of claim 10, which includes means coacting with the innerliner for encasing the bolt and plate in elastomeric material to form an integral clamp assembly for easy handling.

12. The clamp of claim 1, wherein the friction decreasing means (d) includes an elastomeric coating on the sleeve adjacent the innerliner, the elastomeric coating having a low coefficient of friction.

13. The clamp of claim 12, which includes means for increasing frictional engagement between the metal part and sleeve to insure that slippage between the clamp and part occurs between the sleeve and innerliner rather than between the sleeve and metal part.

14. The clamp of claim 13, wherein the innerliner is rubber and the sleeve is plastic.

* * * * *